United States Patent [19]

Bean

[11] Patent Number: 5,274,607
[45] Date of Patent: Dec. 28, 1993

[54] POOL MONITOR

[76] Inventor: John R. Bean, 2596 River Reach Rd., Naples, Fla. 33942

[21] Appl. No.: 964,652

[22] Filed: Oct. 20, 1992

[51] Int. Cl.$^5$ ............................................. G01S 15/00
[52] U.S. Cl. ..................................... 367/98; 367/112; 367/131
[58] Field of Search ................... 367/93, 96, 131, 136, 367/98; 340/565, 566

[56] References Cited

U.S. PATENT DOCUMENTS

| | | | |
|---|---|---|---|
| 4,148,012 | 4/1979 | Baump et al. | 340/825.32 |
| 4,380,091 | 4/1983 | Lively | 4/508 |
| 4,932,009 | 6/1990 | Lynch | 367/136 |
| 5,043,705 | 8/1991 | Rooz et al. | 367/93 |
| 5,049,859 | 9/1991 | Arnell | 340/566 |

*Primary Examiner*—Daniel T. Pihulic
*Attorney, Agent, or Firm*—Robert Charles Beam

[57] ABSTRACT

The present invention shows a system for the continuous echo analysis of a body of liquid, surrounded by walls of known dimension, for the presence of an object. Such a system comprises:

a transmitting component capable of translating an electrical pulse into intermittent instigative pulses of sonic energy emitted into the body of liquid, wherein such pulses of sonic energy permeate the body of liquid, reflecting off the walls and any object within the body of liquid, and returning as a set of echo information;

a receiving component capable of receiving such echo information and translating that echo information into a waveform equivalent of that echo information; and, an analysis component comprising a microprocessor-controlled electronic circuit capable of receiving each waveform and comparing that waveform against stored data on previous waveforms to provide an alarm activation signal when the variance exceeds a predetermined settling.

17 Claims, 1 Drawing Sheet

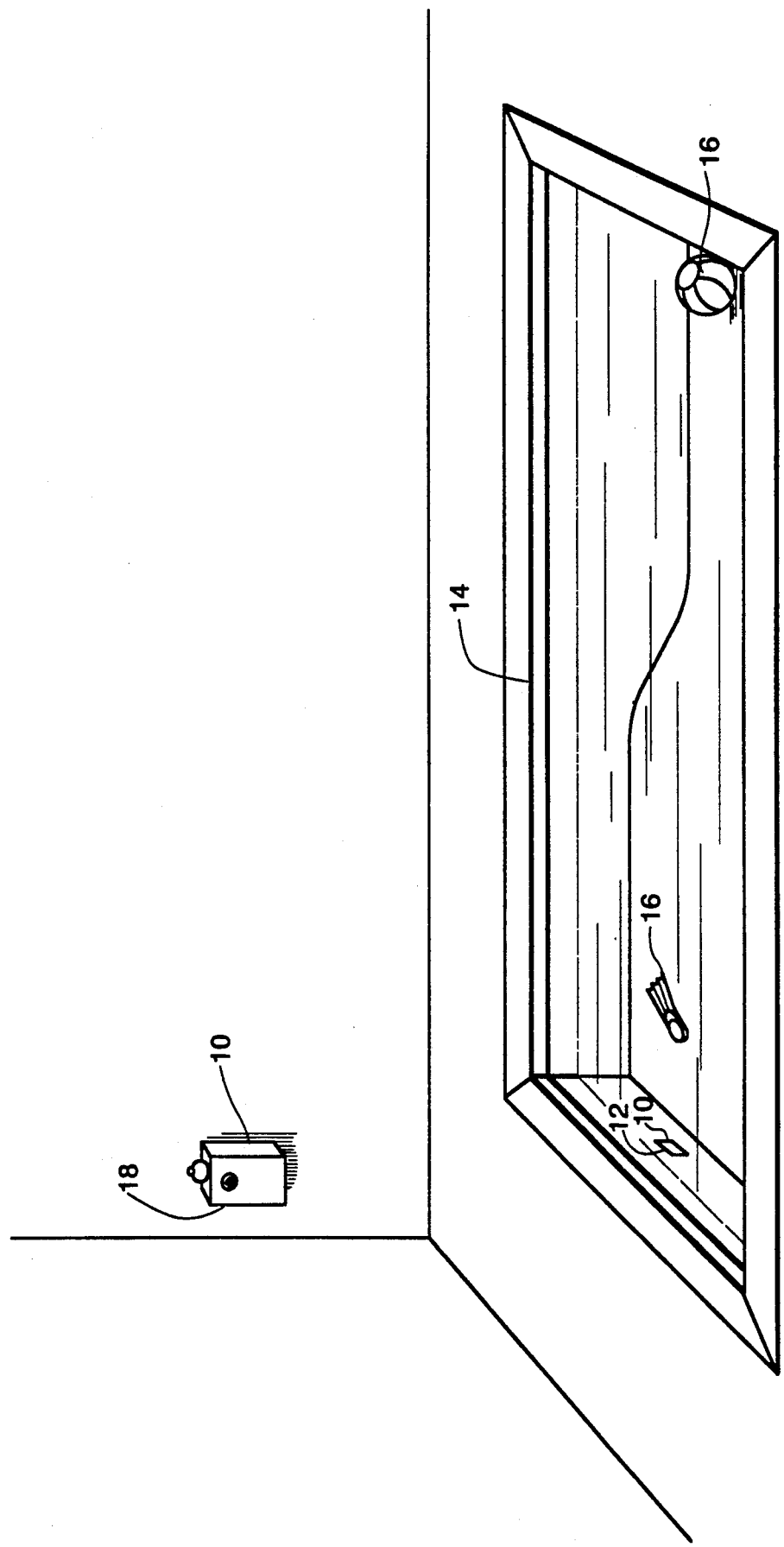

POOL MONITOR

BACKGROUND OF THE INVENTION

1. Field of the Invention

The present invention relates to a system for the continuous echo analysis of a body of liquid. In particular, the present invention relates to a system for the continuous echo analysis of a body of liquid, surrounded by walls of known dimension, for the presence of an object, said system comprising:

- a pulse generating component comprising an electronic circuit capable of generating pulse information;
- a transmitting component operatively connected to said pulse generating component and said body of liquid, capable of activation by the pulse information of said pulse generating component and translating said pulse information into intermittent instigative pulses of sonic energy emitted into said body of liquid, wherein said pulses of sonic energy sequentially permeate said body of liquid, reflecting off said walls and any object within said body of liquid, and returning as a set of echo information;

- a receiving component operatively connected to said body of liquid and capable of receiving said set of echo information generated by each sonic energy pulse and translating that set of echo information into an electronic signal representing a waveform equivalent of that set of echo information;
- an analysis component comprising a microprocessor-controlled electronic circuit operatively connected to said receiving component and capable of receiving the electronic signals representing each equivalence waveform and comparing said waveform against stored data representing at least one previous equivalence waveform to determine variance, and providing an activation signal when the variance exceeds a predetermined settling; and,
- an alarm component operatively connected to said analysis component, capable of providing alarm notification in a selected manner upon receiving an activation signal from said analysis component.

2. Description of Related Art

Monitoring water by the use of sonic means is not novel in the industry. For many decades sonic pulses have been used to locate the bottom of bodies of water and in recent application have been used to locate bodies of mass floating at different levels within such a body.

U.S. Pat. No. 5,049,859 to Clifford G. Arnell is entitled WATER ENTRY ALARM SYSTEM. This reference shows a water-activated sonar transmitter to be worn on the body which emits a low-frequency audio signal upon immersion. An underwater microphone, or hydrophone, is connected to a receiver circuit, which then produces an alarm.

U.S. Pat. No. 5,043,705 to Elkana Rooz and Isaac Ben-Sira is entitled METHOD AND SYSTEM FOR DETECTING A MOTIONLESS BODY IN A POOL. This reference shows a sonar detector system which scans a swimming pool at successive time intervals to identify common contours. A contour which remains motionless for a successive period of time is detected and an alarm is sounded.

U.S. Pat. No. 4,932,009 to Thomas E. Lynch is entitled APPARATUS AND METHOD FOR DETECTING SWIMMERS. This reference shows a plurality of pairs of transducers arranged on opposite sides of the body of water. Pulsed sequential excitation of the transducers is employed to monitor the body of water. A person disposed between a pair of transducers interrupts the transmission of ultrasonic waves, and an alarm is triggered.

U.S. Pat. No. 4,380,091 to Olin A. Lively is entitled CONTROL CIRCUITRY FOR WATER LEVEL CONTROL OF POOLS. This reference shows circuitry for automatically controlling the water level of a swimming pool with a multi-level detecting sensor for directly sensing the pool water.

U.S. Pat. No. 4,148,012 to Paul A. Baump, Don Lyu, Jerry T. Sain, and Richard A. Zbriger is entitled ACCESS CONTROL SYSTEM. This reference shows an access control system for controlling and monitoring access to selected restricted areas and "alarm" conditions at such areas.

SUMMARY OF THE INVENTION

It is an object of the present invention to provide a system for the continuous echo analysis of a body of liquid.

It is a further object of the present invention to provide suitable alarm whenever an object of predetermined size enters a body of liquid.

The other objects, features and advantages of the present invention will become more apparent in light of the following detailed description of the preferred embodiment thereof.

According to the preferred embodiment of the present invention, there is provided a system for the continuous echo analysis of a body of liquid, surrounded by walls of known dimension, for the presence of an object, said system comprising:

- a pulse generating component comprising an electronic circuit capable of generating pulse information;
- a transmitting component operatively connected to said pulse generating component and said body of liquid, capable of activation by the pulse information of said pulse generating component and translating said pulse information into intermittent instigative pulses of sonic energy emitted into said body of liquid, wherein said pulses of sonic energy sequentially permeate said body of liquid, reflecting off said walls and any object within said body of liquid, and returning as a set of echo information;

- a receiving component operatively connected to said body of liquid and capable of receiving said set of echo information generated by each sonic energy pulse and translating that set of echo information into an electronic signal representing a waveform equivalent of that set of echo information;
- an analysis component comprising a microprocessor-controlled electronic circuit operatively connected to said receiving component and capable of receiving the electronic signals representing each equivalence waveform and comparing said waveform against stored data representing at least one previous equivalence waveform to determine variance, and providing an activation signal when the variance exceeds a predetermined settling; and,
- an alarm component operatively connected to said analysis component, capable of providing alarm notification in a selected manner upon receiving an activation signal from said analysis component.

BRIEF DESCRIPTION OF THE DRAWING

The Drawing shows the preferred embodiment of the present invention as it might appear in use with a swimming pool.

DETAILED DESCRIPTION OF THE PREFERRED EMBODIMENT

The concept of the present invention involves techniques useful in monitoring a body of water, or any liquid media, through the means of sonic pulses so guided and analyzed, as to allow the measurement of any change throughout the mass of that liquid. The present invention provides an architecture that will allow monitoring of an object of mass within a pool of water. A baby, for example, that is not normally meant to be in such a pool, could be monitored by a device of the present invention, and an alarm given the second it enters the water.

In such an embodiment, the device of the present invention could be a security and surveillance system for pool use and safety. Other applications would include monitoring for the presence or absence of people in a body of water. There are numerous applications that extend to other types of animals and other bodies within various liquid media.

Monitoring water by the use of sonic means is not novel in the industry. For many decades sonic pulses have been used to locate the bottom of bodies of water and in recent application have been used to find objects of mass floating at different levels within such a body. These concepts are embodied in fish and depth finders. In such technologies pulse reflectometry is used. An incident pulse, provided and generated by an electronic or other means, is directed into the water at given time intervals. Echoes from these instigated pulses are analyzed in both parametric value and time discriminate character to become an echo signature of the objects in the water being analyzed. The change in mass between foreign objects, such as fish, and the water media provides a sharp reflection to the pulse of incidence and generates a reflected pulse that is looked at by a receiving apparatus, part of the instrument of measure.

This type of systematic analysis has been given several different types of names. Sonic reflectometry, echo analysis, and water-, or liquid-, tomography are commonly used. The novelty of each variant application is a function of pulse magnitude, pulse duration and signal processing. It is in these specific characterizations that the techniques employed by the present invention lie.

The echo analysis method of the present invention involves an electronic circuit that will pulse information into a sonic head transducer. Ideally, such a transducer should be active in both a transmit and receive phase and will relay received pulses (echoes) back to an electronic means for analysis.

The first part of the system, therefore is a transmit architecture: the transmit portion of the system of the present invention could be a microprocessor which controls a sequence of control instigative pulses in real time. Each pulse has a finite and controlled duration, typically 50 to 500 microseconds. Such pulses are so developed as to conform to the size of the body of water under investigation.

That is to say, the propagation of sound, in this case high frequency sonic bursts, through a liquid media needs to consider the speed of the sound through that media. This would include the time it takes all signals to reflect back from the most distant object as well as the "bounce" time so critical in the analysis of any chain of echo events.

The transmit architecture provides excitation of a local oscillator circuit. Although the oscillator may be of any sonic duration and frequency, water parameters have shown that signals in the frequency spectrum of 50 kiloHertz to 250 kiloHertz work with great efficiency. The lower frequencies tend to travel with straighter paths and hence permit narrow beam angles from a transducer "head".

This oscillator may be divided down from a local crystal oscillator and should allow a 50% duty cycle to the driver stages. The choice of 50% is made to avoid building DC voltage residuals across the transductive element. A selection matrix should be employed to allow choice of frequency of oscillation.

The transmit "head" should be a piezoelectric crystalline device transducer that is resonant at a selected frequency when electro-stimulated by a high voltage (typically 500–700 volts) source of oscillation. Said a transducer should activate sonic frequencies into the liquid much like a loud-speaker activates sound into the air.

The transmit "head" of the echo analysis device of the present invention should be driven by a pair of Darlington transistors that permit bipolar operation. Said a head is actually a head of duality and can be driven in a "push-pull" technique differentially in time. This will allow complete removal of DC bias on the crystalline structures of the piezoelectric transduction elements.

In summary the head should be allowed to oscillate at its resonant frequency which provides impulses into the water or other liquid media that are short bursts of signal.

The signal permeates the liquid media and returns to the transductive head. At this time all drive circuits should have been removed from the circuit through bias turnoff and the head should be of dual coil design. The second set of windings go the head transducer. The third set is a singular winding for the receiving circuit.

The receiving circuit in the preferred embodiment is in three stages of amplification. All stages are base driven transistors that are current programmed through a pull up resistor to an Automatic Gain Control (AGC) circuit. The stages are isolated through the coils of coupling transformers which also provide a filter at the resonance frequency of the received signals. These signals are at the same frequency of the transmitted waveforms but displaced in time.

The use of filters allows discrimination in channel assignments. The signals returned are at the same frequency as frequency of the signals sent, with minor shifts due to Doppler effect. As such, successive stages of receivers, parallel with the primary stages, could easily be used to selectively receive other frequencies of transmission. Within the application of the architecture it would be feasible to allow several transductive head assemblies to bombard the water media at different frequencies and at different times. In these cases the selection of variant received echoes can provide a more diagnostic understanding on the liquid media's content.

The three stages of receive amplification and filter are terminated into a summing sample and hold circuit that tracks the curvature of the received envelope or envelopes. This waveform is essentially a transcription of a frequency to voltage transform. The waveform is brought towards a series of comparators. The comparators allow a digital device, such as a microprocessor, to sample the waveforms received in byte parallel fashion. In the least of the architectures, three bits of data are provided.

A further path for the end signal, transformed as above into a waveform, is to allow a serial analogue to digital converter to finitely define the value of the signal in a more resolved fashion. This is likewise brought to a microprocessor. Here the goal is to determine the start and end values of the received echoes in an attempt to control the gain-signal product.

During the receive phase of the cycle the echoes gradually diminish due to time decayed signal absorption. This means the signals weaken greatly, in the order of 120 decibels or more. Although in theory the signals bounce around indefinitely, most of the reflections are absent after 500 milliseconds or less of passed time.

The gain of the three-stage amplifier can be controlled by analyzing the received echoes. At first, the primary echoes, and in fact the signal transmitted itself, is quite large and very little gain is required. Than, as time progresses, AGC is required to resolve the weaker signals. A "N" bit digital to analogue converter, driven by a microprocessor, which can be the same one analyzing the received echoes, actively and in real time provides the AGC waveform. This is implemented in its simplest form with a ladder current combine network working through an emitter-follower buffer stage. AGC drive may be by current controlled base bias of a current source that actively pulls up the base current of the three receiver transistors.

Another circuit can be used to shut off the receiver when the transmit pulse is active. This is to insure against damage to sensitive gain stages when this signal is active.

The pulses received are analyzed as to their comparative strength and position in time. They are placed into a memory element controlled by the microprocessor. When the memory buffer is full the processor compares the entire stream to the previous one received. Any new readings are noted and addressed in the application software. Perhaps at times one may wish to resolve that the readings are the same, at other times that they are different.

Overlaying the bit information with analogue sampled values allow one to adjust the receiver's AGC, and hence the signal seen, to compensate for close or distant objects, spurious signals, walls (constant reflections) and other phenomena. The length of the water enclosure can be optimized and the scan rate be set accordingly. The echoes from moving objects can be quantified and either added or removed.

It can be seen that a pool of water or other media can have a different "signature" when foreign bodies are present than when in a "primary" state. Such object resolution has been shown to be as small as one-half cubic foot and without limit on the large size. Software can arbitrate the application and handling of the echoes.

In conclusion, the echo analysis device of the present invention allows for sophisticated analysis of the content of a body of liquid, which may be water or any other liquid media, by successive sampling of echoes returned from reflection within the enclosure and from objects within the liquid media. These reflections are analyzed as to density and permit a "refection signal strength signature" to be established, over time, that identifies mass relationships. Changes in the signature are analyzed with a microprocessor or with other means. Software determine the resultant action to be taken determined by the results of that analysis.

As shown in the Drawing, the preferred embodiment 10 of the present invention employs a combined active sound emitter and receiver 12 that is placed in the water of the swimming pool 14 to be monitored. The emitter/receiver 12 will generate a signal that can be swept through a ninety degree (90°) or greater angle. It will emit a tone as it scans this angle. The receiver portion of emitter/receiver 12 will then pick up the reflections of this tone as they are received from the sides of the pool 14 and any objects 16 in the pool 14. This signal will be used to create a set of echo information, or "signature" of the pool structure 12. The receiver and transmitter are shown constructed as one physical unit 12, but could be separate as well.

The "signature", converted into electronic information, will then be transferred to an analysis unit 18 for comparisons with other sensor readings in the future. Any change in the "signature" will be used to create an alarm condition. An alarm component, contained within the analysis unit 18, will generate a signal through relay contacts, a radio, a logic level, or an audio or visual output. The system can build up a "signature" over time, employing a number of sets of echo information to be combined. This allows the "signature" to be modified and altered as time passes to allow for changes in pool level and other parameters.

In order to generate an alarm the "signature" must deviate from its adjusted norm by a predetermined factor.

The speed of the "signature" can also be adapted. This will allow the "signature" to be tolerant enough to allow normal movement of pool cleaning devices, pool flotation devices and other obstructions. The primary advantage of this system is that it will detect any object entering the water of the pool regardless of the size, shape or impact speed, according the tolerance settings of the system. Unlike detectors known to the prior art, the system will require no special device to be attached to the person to be protected (such as a small child). Strangers and those who may happen upon the pool unknowingly will therefor be protected.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. A system for the continuous echo analysis of a body of liquid, surrounded by walls of known dimension, for the presence of an object, said system comprising:
   a pulse generating component comprising an electronic circuit capable of generating pulse information;
   a transmitting component operatively connected to said pulse generating component and said body of liquid, capable of activation by the pulse information of said pulse generating component and translating said pulse information into intermittent instigative pulses of sonic energy emitted into said body of liquid,
wherein said pulses of sonic energy sequentially permeate said body of liquid, reflecting off said walls and any object within said body of liquid, and returning as a set of echo information;
 a receiving component operatively connected to said body of liquid and capable of receiving said set of echo information generated by each sonic energy pulse and translating that set of echo information into an electronic signal representing a waveform equivalent of that set of echo information;
 an analysis component comprising a microprocessor-controlled electronic circuit operatively connected to said receiving component and capable of receiving the electronic signals representing each equivalence waveform and comparing said waveform against stored data representing at least one previous equivalence waveform to determine variance, and providing an activation signal when the variance exceeds a predetermined settling; and,
 an alarm component operatively connected to said analysis component, capable of providing alarm notification in a selected manner upon receiving an activation signal from said analysis component.

2. The echo analysis system of claim 1, wherein the liquid is water.

3. The echo analysis system of claim 2, wherein the body of liquid is a swimming pool.

4. The echo analysis system of claim 3, wherein the object for which the system monitors is a human body entering said swimming pool.

5. The echo analysis system of claim 1, wherein the pulses of sonic energy are intended to conform to the body of liquid.

6. The echo analysis system of claim 1, wherein the pulses of sonic energy are of finite and controlled duration.

7. The echo analysis system of claim 6, wherein the pulses of sonic energy last from about 50 to about 500 microseconds.

8. The echo analysis system of claim 6, wherein the pulses of sonic energy are at a frequency of from about 50 kiloHertz to about 250 kiloHertz.

9. The echo analysis system of claim 1, wherein the transmitter component has about a fifty percent (50%) duty cycle.

10. The echo analysis system of claim 1 further comprising multiple transmitting and receiving components operating at different frequencies.

11. The echo analysis system of claim 1, wherein the transmitting and receiving component are one integral unit.

12. The echo analysis system of claim 11, wherein the integral transmitting and receiving component comprise a sonic head transducer.

13. The echo analysis system of claim 1, wherein the analysis component compares each equivalent waveform against the previous equivalence waveform to determine variance.

14. The echo analysis system of claim 1, wherein the analysis component compares each equivalent waveform against a composite of previous waveforms to determine variance.

15. The echo analysis system of claim 1, wherein the analysis component accumulates each equivalence waveform into a composite waveform for comparison.

16. The echo analysis system of claim 13, wherein the analysis component provides an activation signal to the alarm component if the determined variance exceeds a predetermined amount.

17. The echo analysis system of claim 14, wherein the analysis component provides an activation signal to the alarm component if the determined variance exceeds a predetermined amount.

* * * * *